United States Patent [19]

Varacins et al.

[11] 4,126,040
[45] Nov. 21, 1978

[54] LIQUID LEVEL GAUGE

[75] Inventors: Alan J. Varacins, Downers Grove; Richard J. Richards, Libertyville; Joseph A. Ferro, Park Ridge, all of Ill.

[73] Assignee: Gard, Inc., Niles, Ill.

[21] Appl. No.: 865,836

[22] Filed: Dec. 30, 1977

[51] Int. Cl.² ............................................. G01F 23/00
[52] U.S. Cl. ................................. 73/293; 73/DIG. 5; 340/620
[58] Field of Search ...................... 73/293, 290 R, 321, 73/308, DIG. 5; 116/118 R; 340/244 R, 378 R, 380

[56] References Cited

U.S. PATENT DOCUMENTS

| | | | |
|---|---|---|---|
| 2,032,370 | 3/1936 | Larkin | 73/314 |
| 2,371,511 | 3/1945 | Faus | 73/DIG. 5 |
| 3,062,994 | 11/1962 | Mesh | 73/304 R |
| 3,206,979 | 9/1965 | Banks | 73/290 V |
| 3,217,541 | 11/1965 | Williamson | 73/321 |
| 3,283,578 | 11/1966 | Moore | 73/321 |
| 3,368,404 | 2/1968 | King | 73/304 R |
| 3,440,880 | 4/1969 | Hoyer | 73/321 |
| 3,500,546 | 3/1970 | Pilcher | 73/321 X |
| 3,513,702 | 5/1970 | Portis | 73/290 R X |
| 3,555,905 | 1/1971 | George | 73/321 |
| 3,703,830 | 11/1972 | Maeshiba | 73/321 |
| 3,792,331 | 2/1974 | Wissmiller et al. | 73/304 R X |
| 3,969,941 | 7/1976 | Rapp | 73/290 R |
| 4,038,650 | 7/1977 | Evans et al. | 340/244 R |
| 4,056,887 | 11/1977 | Tucker et al. | 73/295 |
| 4,064,755 | 12/1977 | Bongort et al. | 73/313 |

FOREIGN PATENT DOCUMENTS

| | | | |
|---|---|---|---|
| 878,190 | 9/1961 | United Kingdom | 73/321 |
| 236,788 | 6/1969 | U.S.S.R. | 73/321 |
| 393,577 | 12/1973 | U.S.S.R. | 73/293 |

OTHER PUBLICATIONS

Liquid-Level & Solids Sensing Controls, Genelco, Inc. Publication.
Magnetic Drives, in Indiana General (publication), Form 382, Apr. 1968.
Ceramic Axial Gap Synchronous Drives, in Indiana General (publication), Catalog 398, Apr. 1968.

Primary Examiner—Richard C. Queisser
Assistant Examiner—Joseph W. Roskos
Attorney, Agent, or Firm—Claron N. White

[57] ABSTRACT

A liquid level gauge for a tank, especially a pressurized railway tank car, has a housing with a bottom opening mounted at a top opening of the tank. A horizontal shaft is rotatably mounted in the housing between opposed walls having parallel flat vertical inner surfaces. A sprocket is fixedly mounted on the central part of the shaft, on each end of which is fixedly mounted a ring magnet spaced from one of these walls. Complementary ring magnets are rotatably mounted outside but adjacent these opposed walls. The four ring magnets constitute a pair of magnetic drives. A track and cable guide assembly, supported in the tank, extends from the bottom portion of the tank. A perforated tape is trained over the sprocket on the shaft and another sprocket rotatably mounted in the bottom portion of the tank so that the tape is under tension. A probe assembly connected to the tape moves vertically when the sprocket in the housing is rotated. The probe assembly senses a liquid-vapor interface and rides in the track and cable guide assembly. An electric cable connected to the probe extends up to the housing. Pulleys and cables keep the electrical cable under tension. One magnetic drive is rotated to move the tape and operate the other magnetic drive that has its complementary ring magnet connected to a device to indicate the position of the probe.

8 Claims, 26 Drawing Figures

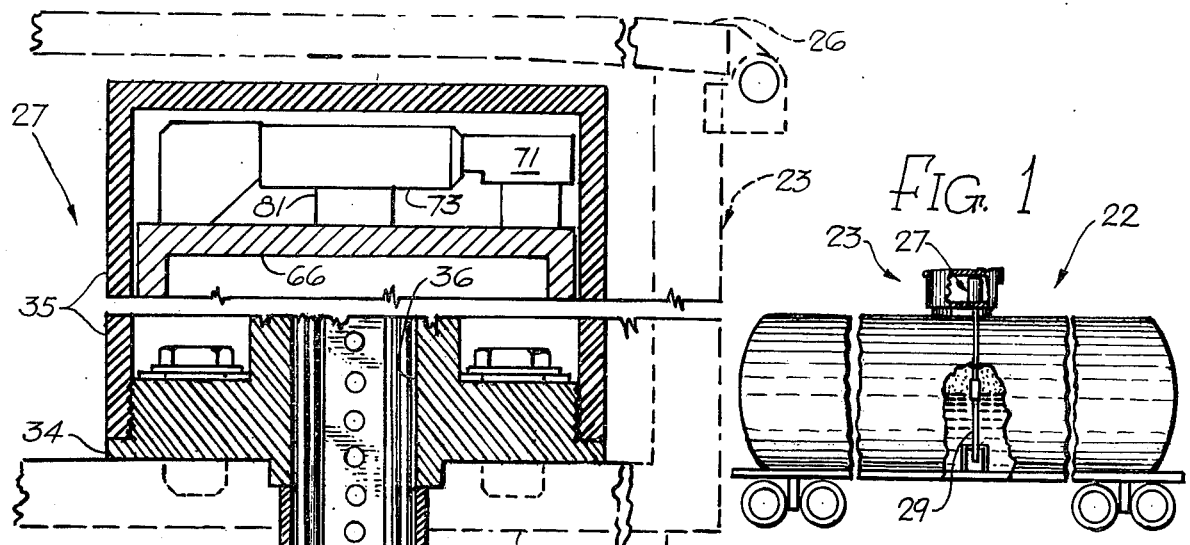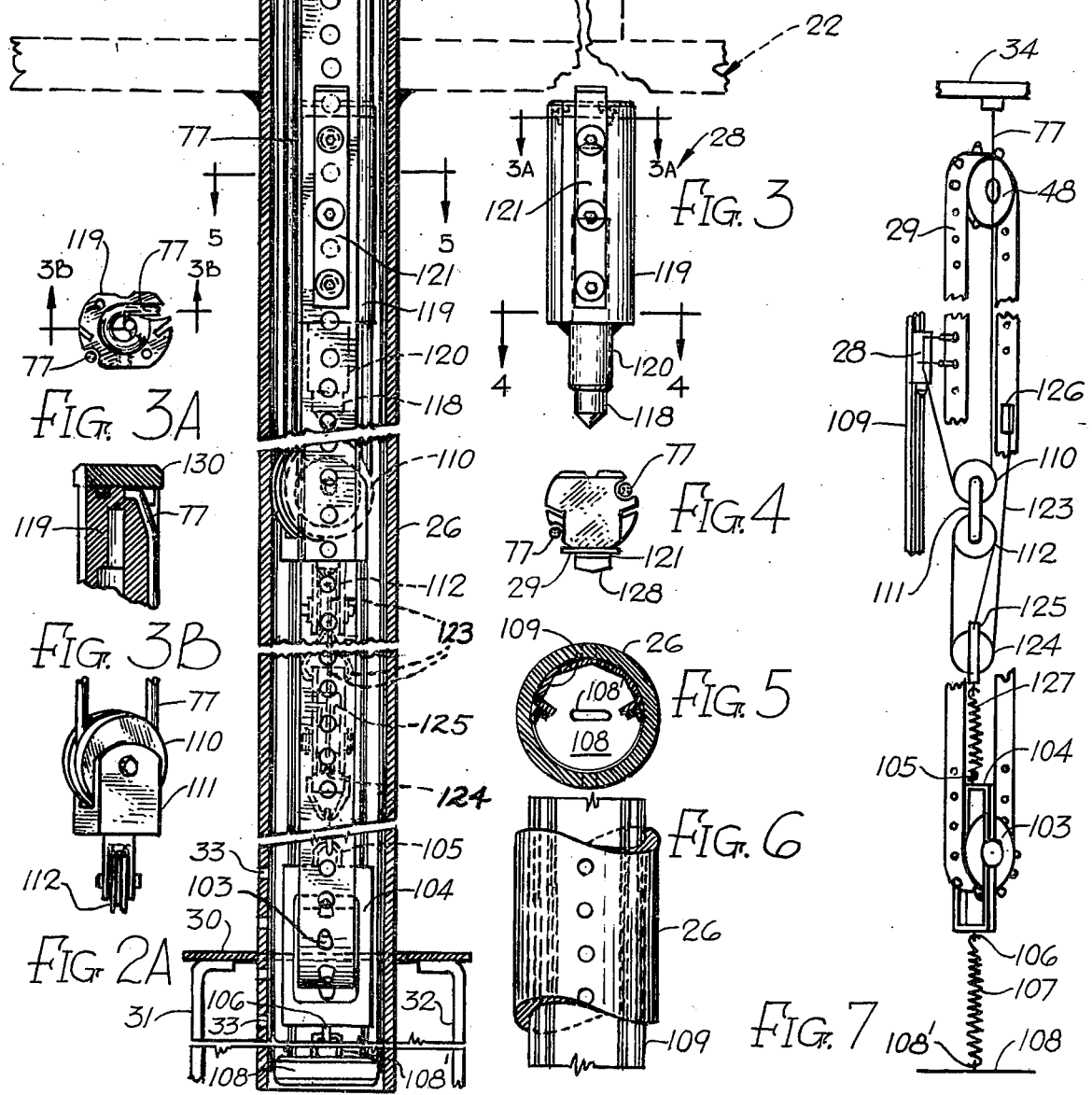

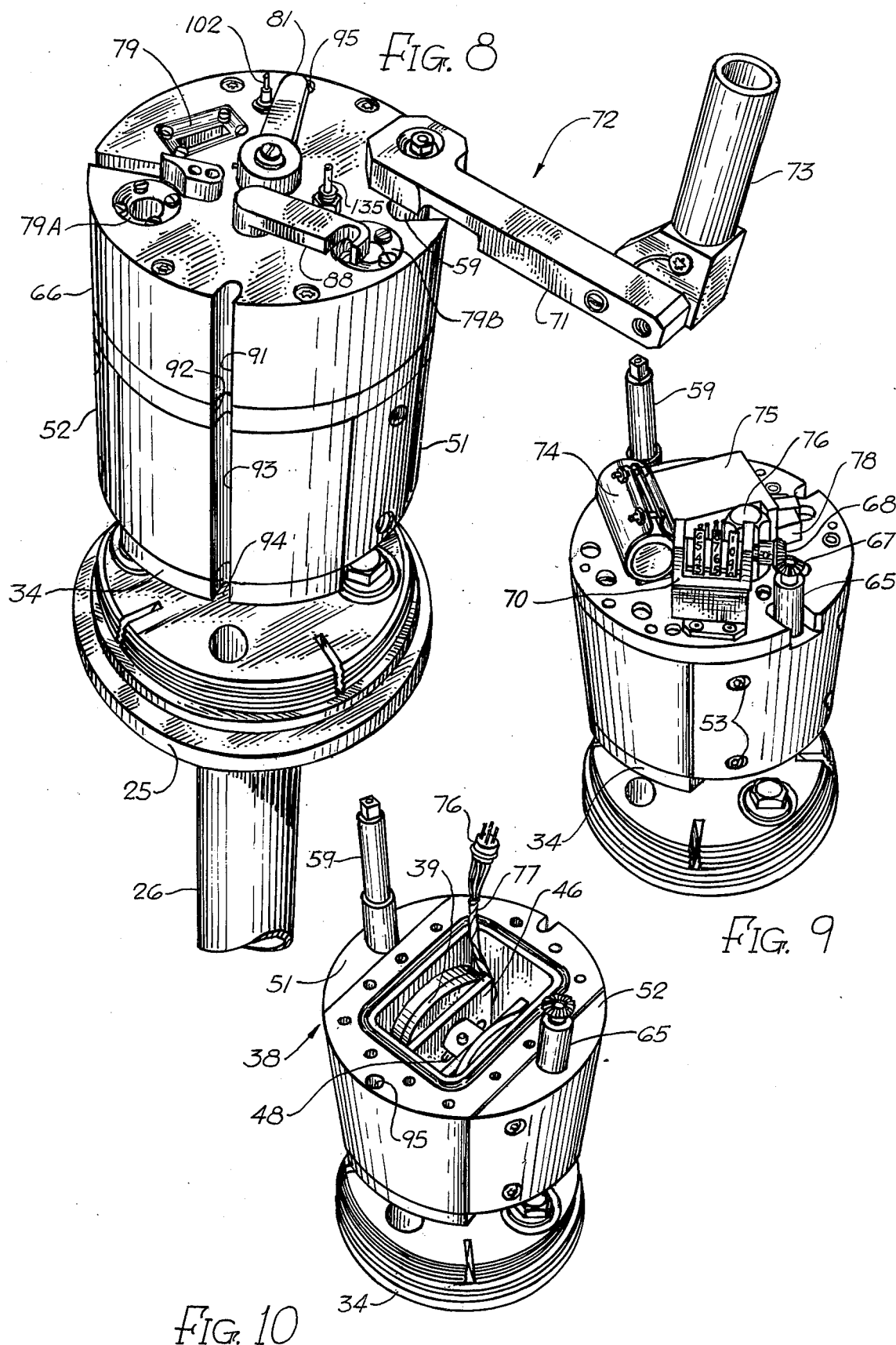

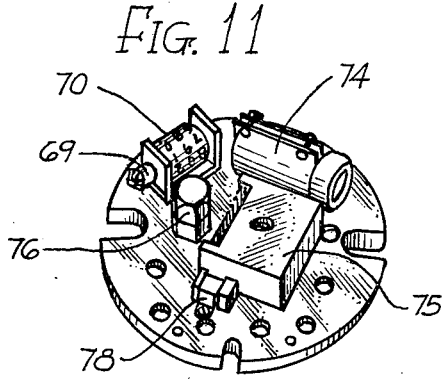
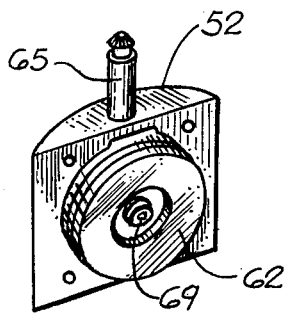
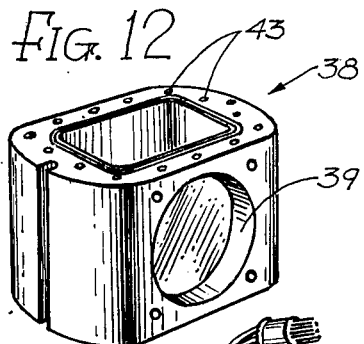
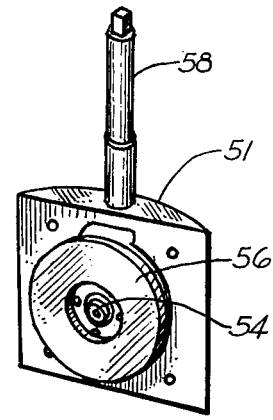
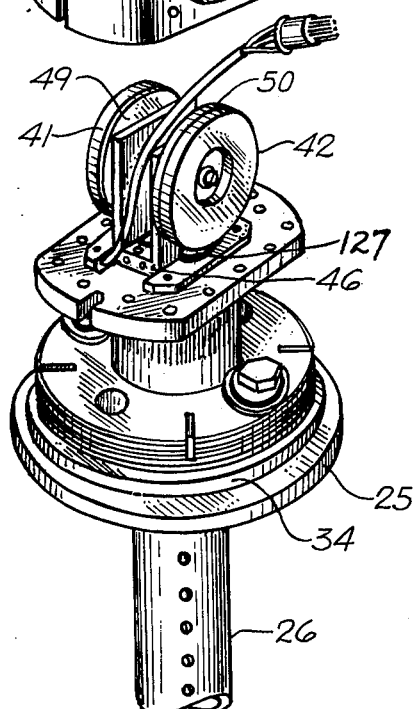

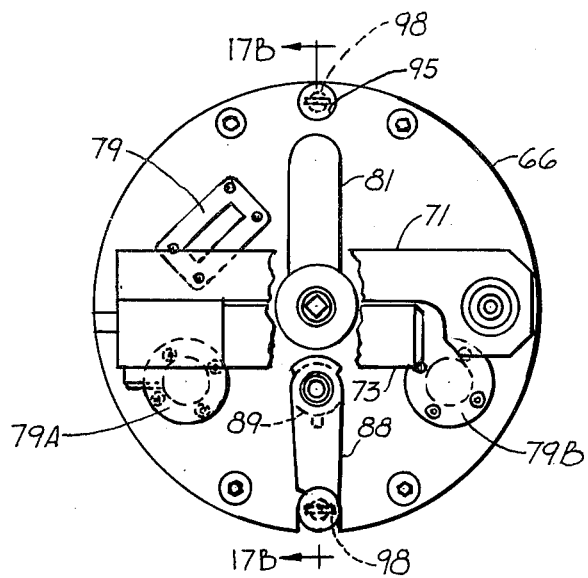
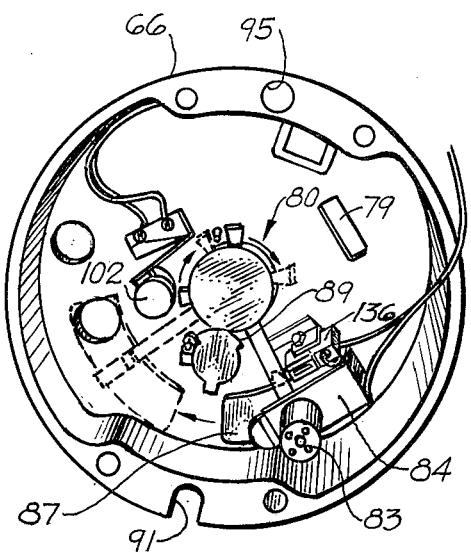
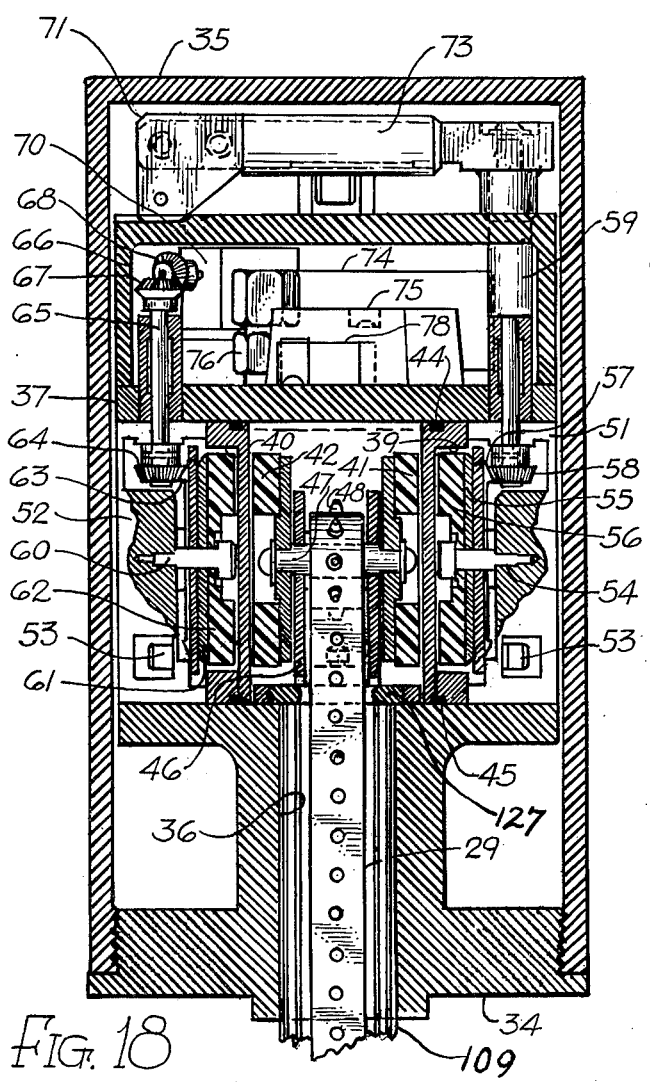
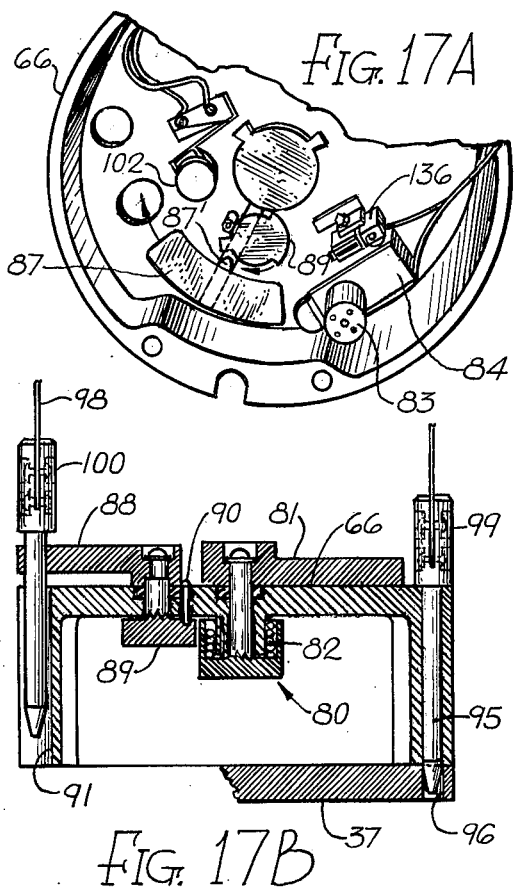
FIG. 16
FIG. 17
FIG. 17A
FIG. 18
FIG. 17B

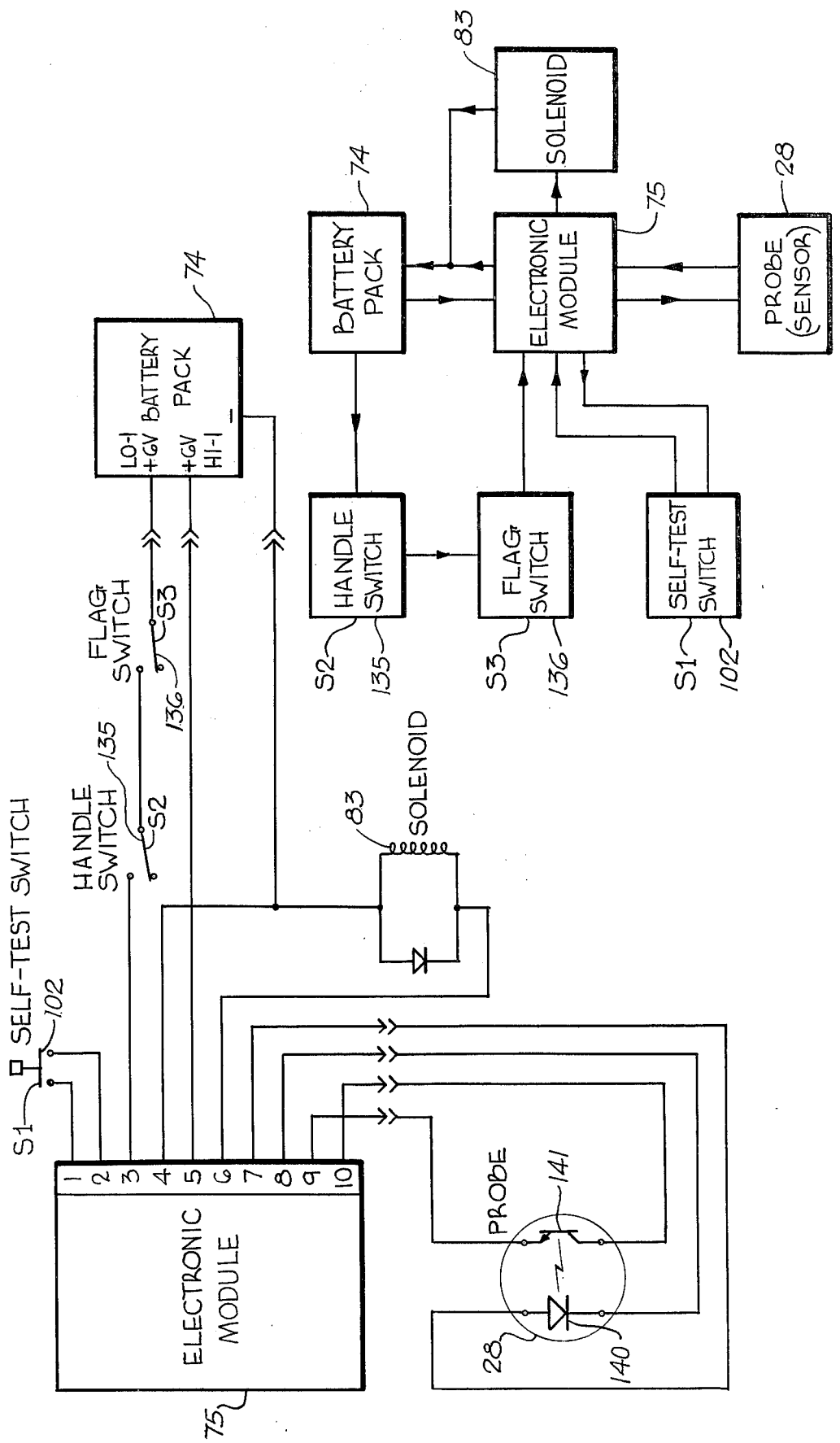

LIQUID LEVEL GAUGE

BACKGROUND OF THE INVENTION

1. Field of the Invention

There are many types of liquid level gauges. When the gauge is required to determine the level in a closed container most gauges are constructed in a manner to require a dynamic seal to prevent loss of product in the tank. The effectiveness of a seal is important when the tank contains pressurized liquid. In many cases the liquid is under pressure of up to 600 psig.

2. Description of the Prior Art

Most of the liquid level gauges used to detect the liquid-vapor interface in a closed tank utilizes a float that, when moved, moves a cable extending through the top of the tank. Such construction requires a dynamic seal.

There is one known device for measuring liquid level that requires only a static seal. That device is disclosed in U.S. Pat. No. 2,371,511. In the device of that patent there is a light magnet mounted on a float in the tank. A vertical magnetized shaft extends upwardly through the float that has its magnet with magnetic pole faces. Rotation of the float is prevented. As a result, the shaft rotates when the float moves vertically. At the upper end of the shaft within the tank is fixedly mounted a permanent bar magnet. This magnet is within a cylindrical vertical offset in a part of the top wall of the tank. A central upstanding boss on the offset rotatably supports a vertical stub shaft on the top end of which is fixedly mounted a pointer. On the stub shaft is fixedly mounted an inverted cylindrical cup that supports a ring magnet at the elevation of the permanent bar magnet mounted on the magnetized bar in the tank. The bar magnet and the ring magnet constitute a synchronous radial type of magnetic drive so that the turning of the vertical shaft in the tank by the vertical movement of the magnet on the float turns the ring magnet and thereby turns the pointer. By virtue of this construction the pointer will indicate the position of the float, that is indicative of the position of the liquid-vapor interface in the tank.

SUMMARY OF THE INVENTION

The liquid level gauge of the present invention includes a probe and has a construction such that the movement of the probe does not require a dynamic seal. The gauge can be mounted on a tank with a static seal. The liquid in the tank can be under a very substantial pressure, e.g., a pressure of up to 600 psig during a filling operation. Although the liquid level gauge is useful with storage tanks it is especially useful to measure the level of pressurized liquid in pressurized railway tank cars during a filling operation or before and after liquid removal operations.

The gauge is useful to locate and indicate the liquid level in a storage tank by moving the probe vertically down in the vapor until it enters the liquid. For a liquid loading operation the probe at a predetermined position indicates when the liquid transferred to the tank has reached that elevation. In the latter case the probe is moved to the desired level and senses the rise of the liquid to that level without any movement of the probe during the addition of liquid to the tank. This is not possible with a gauge that depends on a float that, of course, must move upwardly as the liquid is added to the tank.

The liquid level gauge of the invention is described below for its preferred use with a railway tank car that can receive and transport liquids under high pressure. These pressurized liquids are gases at normal ambient pressure and temperature. Such products in pressurized liquid form are: LPG (liquefied petroleum gas); anhydrous ammonia; dry vinyl chloride; butadiene; methyl chloride; anhydrous monomethylamine; anhydrous dimethylamine; anhydrous trimethylamine; ethylene oxide; methyl mercaptan; and Freon. Such chemicals will be in contact with components of the liquid level gauge of this invention for extended periods of time at temperatures that can range between about −50° F. to +200° F. Some of the products may provide an explosive mixture with air if there is leakage from the tank during the operation of a gauge or as a result of repeated usage of the gauge. Some products are highly toxic chemicals, that should not be leaked to the atmosphere. Most, if not all, can result in air pollution if leaked from the tank. Leakage will not result from the operational use of the gauge of the invention. It will occur, if at all, only as a result of a failure of a static seal and that failure will not be due to the operation of the gauge.

The liquid level gauge includes a liquid-level sensing means and a housing that, in the use of the gauge, is mounted at a top opening of a tank. The housing has a bottom opening that is in alignment with the top opening of the tank when the gauge is mounted for use. The sensing means is a component of a probe assembly that is supported below the housing by means extending upwardly into the housing. A horizontal shaft is rotatably mounted in the housing between a pair of opposed walls of the housing. Means mounted on the shaft is operatively connected to the support means for the probe assembly to provide vertical movement of the probe assembly upon rotary movement of the shaft in the housing. The gauge further indicates a vertical track and cable guide assembly for the probe assembly.

Preferably the support means for the probe assembly is a perforated tape and in that construction the means mounted on the shaft to move vertically the probe assembly is a drive sprocket fixedly mounted on the shaft in the housing. The drive sprocket is mounted on the central part of the shaft and engages the tape. A driven ring magnet and a drive ring magnet are fixedly mounted on the ends of the horizontal shaft so that they are spaced slightly from the parallel inner vertical surfaces of the opposed walls of the housing.

The gauge also includes a drive ring magnet and a driven ring magnet that are rotatably mounted on horizontal shafts outside the housing and closely spaced from the outer surfaces of the opposed walls of the housing. At the location of the latter two ring magnets the outer surfaces of the opposed walls are flat and parallel to the inner surface of the walls so that these ring magnets are separated from the driven and drive ring magnets, respectively, in the housing by a relatively small gap in which is located a part of the associated one of the opposed walls. By this arrangement the two ring magnets (drive ring magnet and driven ring magnet) outside the housing and the two ring magnets (driven ring magnet and drive ring magnet, respectively) inside the housing constitute two magnetic drives, namely, a drive magnetic drive and a driven magnetic drive. As a result, the turning of the outer drive ring magnet will turn the driven ring magnet inside the housing. This provides a turning of the shaft in the housing to move vertically the probe assembly and a turning of the drive ring magnet in the housing that provides a turning of the driven ring magnet outside the housing.

The construction of the gauge of the invention with its two magnetic drives provides a balancing of end thrust forces on the means, preferably sprocket, that moves the probe assembly support means, preferably the perforated tape, on which the probe assembly is supported. Also, the second magnetic drive that operates the device to indicate the position of the probe assembly does not lose the synchronization between the probe assembly and the probe-position indicating device if, after the probe assembly has been raised or lowered to its maximum permitted position of travel, force is continued to the drive ring magnet of the first magnetic drive.

The probe assembly of the liquid level gauge is preferably an opto-electronic device that senses the liquid level, as the probe enters it or the liquid rises to the probe. In lieu of the opto-electronic device other probes and electronic packages that operate on different principles (e.g., capacitive, sonic, thermal) can be used.

The opto-electronic device of the probe assembly includes a light source, a light sensor and a transparent bottom tip shaped so that the light from the light source is refracted to the light sensor when the tip is not in liquid, i.e., is in the vapor, and the light passes out of the tip and thus is not received by the light sensor when the tip is in the liquid. The device can be a normally off type of device that turns on a switching circuit when the tip is contacted by liquid or a normally on type of device that turns off a switching circuit when the tip is contacted by liquid. The former type is preferred especially for use with mobile tanks, such as tank cars, because the latter type of the device is a continuous drain on the power source while power is switched on. Of course, the electric circuits responsive to the change in the condition (on or off) of the device for the two types of the opto-electronic device are different.

The use of the normally off device is especially preferred for use with a mobile tank because it is necessary as a practical matter, that each tank be provided with a liquid-level gauge that includes as a part of the packaged construction a battery pack to provide the power source to operate the opto-electronic device and to operate means responsive to the change of condition of the device in which that condition-responsive means is a part of the packaged gauge to provide a signal to operate, i.e., trip, means constituting an internal flag or an external flag or both whenever liquid sufficiently comes into contact with the tip of opto-electronic device.

The power source can be used with an electronic device to monitor the rotation of the driven ring magnet of the driven magnetic drive to indicate the position of liquid-vapor interface as determined by the position of the probe assembly. Again, to minimize power drain in the use of the gauge with a mobile tank, such as a tank car, the gauge is constructed, as described later with a reversible mechanical counter that is operatively connected to the rotatable shaft on which the driven ring magnet of the driven magnetic drive is fixedly mounted. In that construction, the counter can be visually read on top of tank car and, of course, the numerical count is indicative of the elevation of the operative position of the tip of the opto-electronic device in inches or the like from the top or bottom, preferably the former, of the tank and thus indicative of the volumetric capacity of the tank up to the tip's operative position.

The opto-electronic device can operate a device remote from the gauge and from the tank, but for use with a mobile tank, again to minimize power drain when the power source is a battery pack on the tank, the packaged gauge includes the flag means, mentioned above, as means responsive to the operation of opto-electronic device.

The outer drive ring magnet of the drive magnetic drive, when turned, operates both magnetic drives to turn the horizontal shaft on which is fixedly mounted the outer driven ring magnet of the driven magnetic drive. In one construction, there is a drive vertical shaft and gear assembly that has one of its gears rigidly mounted on the shaft on which the outer drive ring magnet of the drive magnetic drive is mounted. A handle is fixedly mounted on the top end of the vertical shaft. Similarly the shaft on which the outer drive ring magnet of the driven magnetic drive is connected by a driven vertical shaft and a gear assembly that is connected to a reversible counter.

The housing has top and bottom walls that extend beyond the opposed walls that are between the ring magnets of the two magnetic drives. Between each of two extensions of the top and bottom walls of the housing are mounted support means for the shaft on which the outer ring magnet is mounted, and for one of the vertical shaft and gear assemblies. The vertical shafts of the shaft and gear assemblies extend upwardly through these extensions of the top wall of the housing. On the top wall of the housing is an instrument housing within which is located the counter and the top part of the driven vertical shaft and gear assembly that is connected to the reversible counter. The vertical shaft of the drive vertical shaft and gear assembly extends upwardly through the top wall of the instrument housing. The handle is mounted on the top end of that shaft. The top wall of the instrument housing has a window to permit reading of the count of the counter.

The flag means in this construction may include in the instrument housing an internal flag arm that is moved about a vertical axis into alignment with a window in the top wall of the instrument housing to indicate that the gauge has operated, due to movement of the effective bottom part of the probe assembly into liquid or due to the rise of the liquid to that level of the probe assembly.

In that construction the one end of the flag arm has an integral upstanding shaft that extends through the top wall of the instrument housing. On the top end of the upstanding shaft is a horizontal arming lever that is above the top wall of the instrument housing and supports the flag arm. That shaft is turned by the arming lever from a tripped position to the armed position where the flag arm when armed can be seen through the window. Another window is above the flag arm's position when it is tripped.

This cocking movement of the flag arm to the armed position winds up a spring. When the flag arm is moved into the armed, i.e., cocked position, it is held in that position by a solenoid-operated latch that is within the instrument housing and is supported by top wall of that housing. Whenever power is switched on and the probe is in liquid, the solenoid-operated latch releases the internal flag arm. The energy in the wound up switch then can drive the flag arm to its tripped position. This movement also turns the arming lever.

In the construction of the liquid level gauge of the invention for loading a tank it is desirable for a one-man filling operation that he be able to stop the pumping of liquid into the car when the liquid level has risen to the desired height. In that construction an external flag is present. The side wall and top wall of the instrument housing have a coaxial hole in which the bottom end portion of a flexible flag pole is inserted. Diagonally opposite that hole is a vertical peripheral slot in the instrument housing that receives the top end portion of the pole when it is bent to an inverted generally U-shape. The top end portion of the pole is held in this slot by latch means, including a horizontal latch arm above the instrument housing. The latch means is mounted on and extends through the instrument housing and is constructed to be held in latching position by detent means that engages a part of the latch means in the instrument housing whenever the latch arm is moved to its latching position. That movement is provided after the internal flag arm is cocked. The flag arm and the portion of the latch means in the instrument housing are constructed and positioned so that when the flag arm is triggered it hits the portion of the latch means in the instrument housing to release it from the detent means and move it sufficiently so that the latch arm is moved away from the slot. As a result, that top end portion of the flag is released. The pole unbends and the flag is unfurled. It can be seen from a position several hundred yards away where the operator can then stop the remote filling operation.

DESCRIPTION OF THE DRAWINGS

FIG. 1 is a schematic view of a pressurized tank car partially broken away to show a preferred embodiment of the liquid level gauge of the invention constructed for its use to sense the level of liquid in the tank car. In the view, the tube mounted in the tank car and into which the bottom portion of the gauge extends is not shown.

FIG. 2 is a vertical section of this preferred embodiment of the gauge showing its mounting in the tube in the tank and showing in phantom the top of the tank and its top bonnet arrangement in which the top part of the gauge is mounted.

FIG. 2A is a view of the electric cable block assembly that is a part of the construction to retain the cable under tension during the movement of the probe assembly and showing a fragmentary part of the cable that is trained around the upper pulley of the block assembly.

FIG. 3 is an elevational view of the probe assembly of the gauge.

FIG. 3A is a section taken along line 3A—3A of FIG. 3, showing the cable of the gauge and its connection to the guide assembly.

FIG. 3B is a fragmentary section taken along line 3B—3B of FIG. 3A showing only a part of the cable.

FIG. 4 is a section taken along line 4—4 of FIG. 3 with the cable in position.

FIG. 5 is a section taken along line 5—5 of FIG. 2 with the track and cable guide assembly in the tube but the balance of the bottom part of the gauge is not present.

FIG. 6 is a fragmentary view of a top part of the tube and of the track and cable guide assembly in the top part of the tank showing holes in the tube for passage of vapor in the tube when the vapor is displaced by rising liquid in the tube.

FIG. 7 is a fragmentary schematic view of the gauge showing the construction by which the electric cable and the perforated tape are maintained under tension.

FIG. 8 is a perspective view of the top portion of the gauge with its cover removed and with the handle shown in its unfolded position for manual turning to move the probe assembly vertically by turning the drive magnetic drive.

FIG. 9 is a perspective view of the top portion of the gauge with the cover, handle and the instrument housing cover removed.

FIG. 10 is a perspective view of the top portion of the gauge with the cover, handle, instrument housing and top plate of the housing, that contains two of the ring magnets and the drive sprocket and that communicates with the top opening in the tank, removed.

FIG. 11 is a perspective view of the top cover plate of the housing that contains the two ring magnets and the drive sprocket.

FIG. 12 is a perspective view of a component of the housing containing the two ring magnets and the drive sprocket, showing the cylindrical recess that is in each of the opposed parallel walls of the housing in which the ring magnets outside the housing are located when the gauge is assembled.

FIG. 13 is a perspective view of the support housing for the driven ring magnet of the driven magnetic drive and showing that ring magnet and the counter drive shaft of the shaft and gear assembly rotated by that driven ring magnet.

FIG. 14 is a perspective view of the support housing for the drive ring magnet of the drive magnetic drive and showing that ring magnet and the drive shaft of the shaft and gear assembly that turns that drive ring magnet.

FIG. 15 is a perspective view of the top portion of the gauge with components removed to show the mounting of the two ring magnets on the bottom plate of the housing containing them and the drive sprocket.

FIG. 16 is a top plan of the gauge with the cover removed and parts broken away and showing in phantom the ends of the external flag when mounted on the top of the instrument housing.

FIG. 17 is a bottom perspective view of the instrument housing showing the internal flag in its armed position.

FIG. 17A is a fragmentary bottom perspective view of the instrument housing showing the position of the flag arm, during the part of its movement to the tripped position, where it moves the latch arm from its latching position to permit an unfurling of the external flag.

FIG. 17B is a fragmentary section taken along the line 17B—17B of FIG. 16 showing the ends of the external flag in position in the instrument housing and the latch arm at the position it prevents the outward movement of one end of the external flag.

FIG. 18 is a vertical section of the top part of the gauge.

FIG. 19 is an electrical schematic drawing showing the probe, the solenoid of the solenoid-operated latch, the power source, various switches, and the electronic module providing the control and switching circuits.

FIG. 20 is a block diagram of the electrical system shown in FIG. 19.

DETAILED DESCRIPTION

Figure 21:
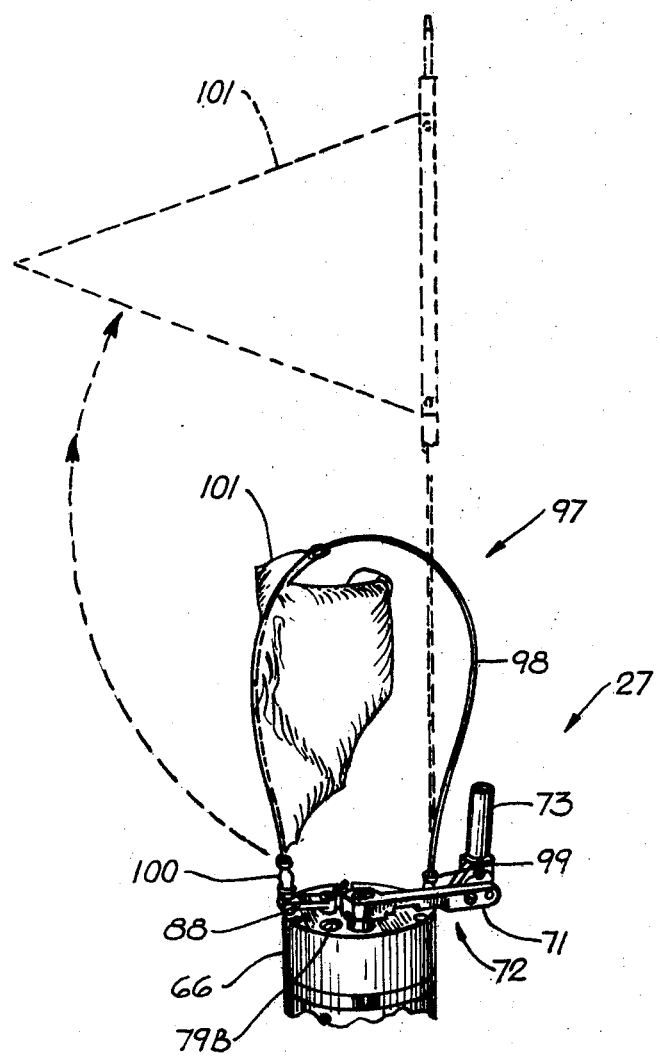
FIG. 21 is a perspective view of the top part of the gauge with its cover removed and the external flag mounted, along with a showing of the external flag by phantom lines after the latching arm has been moved from the latching position.

A tank car generally indicated at 22 in FIG. 1 has a conventional bonnet arrangement generally indicated at 23 mounted on the top of tank of car 22. As seen better in FIG. 2, between bonnet arrangement 23 and the tank car 22 is a tubular spacer 24 so that the bottom wall 25 of bonnet arrangement 23 is spaced above the tank of car 22. Conventionally in bonnet arrangement 23 is normally a check valve and extending downwardly into the tank are a discharge pipe, a thermometer well pipe, a test tube and a guide pipe in which is mounted a gauging device. The gauging device of the conventional construction that uses dynamic seals is replaced by the liquid level gauge of the present invention. Only guide pipe 26 (FIG. 2) is shown in the drawings. It is not shown in FIG. 1 with the gauge of the invention. The bonnet arrangement 23 has a pivotally mounted cover 26.

The liquid level gauge of the present invention is generally indicated at 27. The probe assembly generally indicated at 28 is seen in FIG. 1 with a schematic representation of a perforated tape 29 on which probe 28 is mounted in the tank of car 22.

The bottom end of tube 26 extends to a position at or near the bottom of the tank of car 22. The bottom of tube 26 extends through an opening of a horizontal plate 30 that is supported at a fixed position above the bottom of the tank by supports 31 and 32, as in a conventional construction for a guide pipe in a tank of a tank car. Tube 26 is welded to the top of the tank as shown in FIG. 2. As seen in FIG. 6 tube 26 at its top portion, that is within the tank, contains a number of holes so that vapor can extend from tube 26 as liquid rises in the tube with the rise of liquid in the tank. The liquid can enter the bottom portion of tube 26 through holes 33 (FIG. 2).

The upper portion of gauge 27 includes a cylindrical base plate 34 (FIG. 18) that has an intermediate annular recess (not numbered) to provide access to the bottom part for bolting plate 34 to wall 25 (FIG. 2). Above the annular recess plate 34 has a smaller diameter than a bottom part, that has a bottom annular shoulder. Above this annular shoulder the bottom part is threaded to receive a cover 35 for the top portion of gauge 27. The upper part of base plate 34 has a smaller diameter to provide clearance for cover 35. The plate 34 has a central vertical cylindrical hole 36 in alignment with tube 26 and the hole in bottom wall 25 into which tube 26 extends.

Spaced above base plate 34 is a cylindrical plate 37. Between plate 37 and base plate 34 is located a housing component generally indicated at 38 (FIG. 12). The base plate 34 and plate 37, as the bottom and top walls, and housing component 38, as the side walls, provide a housing that is open only at the bottom. That opening is provided by hole 36 in base plate 34. The housing component 38 has a pair of opposed vertical walls that have their inner surfaces vertical, flat and parallel to each other. The outer side of these walls are flat and have aligned horizontal cylindrical recesses 39 and 40 that receive ring magnets 41 and 42 that are mounted as described later. The two walls, at the base of the recesses 39 and 40, are vertical and thus parallel to the inner surfaces of the opposed walls of housing component 38 at that location. Of course, the thickness of the walls at this location is sufficient to withstand the pressure in the tank of car 22 to which the walls are subjected because the interior of housing component 38 communicates with the interior of the tank of car 22 through hole 36 of base plate 34.

The plates 34 and 37 are connected to each other by nuts and bolts (not shown) that extend through vertical holes 43 in housing component 38 (FIG. 12) and aligned holes in plate 37 (FIG. 9) and base plate 34 (FIG. 15). The top of housing component 38 has a groove, around and adjacent to its central rectangular opening, where a static seal 44 is located to prevent pressurized fluid from passing between plate 37 and the top of housing component 38. The bottom surface of housing component 38 is provided with a similar groove in which a static seal 45 is located to prevent egress of pressurized fluid from the interior of the chamber of housing component 38. To reduce the weight of the gauge the part of base plate 34 above its annular recess has a shape so that its outer periphery conforms to the outer shape of housing component 38 except for its recesses 39 and 40. This is seen in FIG. 15.

The top surface of base plate 34 has a pair of elongated raised portions (FIG. 15) having vertical shoulders. The raised portions are on opposite sides of hole 36. The intermediate portion of the two elongated shoulders, that face each other, are curved with a center of curvature of each at the vertical axis of hole 36 and these curved shoulder portions have a larger radius than hole 36. The other elongated shoulders of these raised portions are parallel to each other and, at the end, the end shoulders are in alignment with each other. The end shoulders and the parallel elongated shoulders provide proper alignment, relative to hole 36, for the mounting of housing component 38 on base plate 34 with the raised portions within component 38.

The top surface of plate 34 has a slanted slot (not shown) extending downwardly from the top of one of the elongated raised portions and toward the vertical axis of hole 36. The raised portion has a groove extending from that slot to one end of that raised portion. A cover plate (FIG. 15) in the final assembly is secured on that raised portion to overlie the groove through which an electric cable 34 extends from above plate 34 (FIG. 15) and then extends through the slanted slot and down through hole 36 to connect to probe assembly 28.

The bottom part of base plate 34 that is threaded has a number of radial slots (not numbered), shown for example, in FIG. 15, so that any pressure is relieved gradually as cover 35 is removed in the event that there has been a leak at either static seal mentioned above. This is merely a safety feature, because it is expected that such leakage will not occur during the use of gauge of the invention.

A U-shaped sprocket support member 46 is secured on the top of base plate 34 between and aligned by the pair of elongated raised portions, mentioned above, on top of base plate 34. The base of member 46 has a central hole (not numbered) with the radius of curvature of the facing curved shoulders of the two elongated raised portions to complete a larger hole above hole 36. As a result there is no base of support member 46 below the central part of each leg. This construction permits the placement of a top cylindrical plug (FIG. 18) of a guide assembly, mentioned later, inside the central hole in the base of member 46 where it is secured by a pair of screws in horizontal holes (not numbered) in the base of member 46 and then with the rest of the guide assembly extending through hole 36 and below plate 34, member 46 is secured on plate 34 by bolts through vertical holes (not numbered) at the ends of the base of member 46 into plate 34.

A drive sprocket 48 is fixedly mounted on shaft 47 between the legs of member 46 and in alignment with the opening hole 36. The shaft 47 extends beyond both legs. At the end of shaft 47 beyond one leg is fixedly mounted a steel disc 49 on the outer face of which is secured a ring magnet 41. Similarly on the other end of shaft 47 there is rigidly mounted a steel disc 50 on the outer face of which is secured ring magnet 42.

In the outer portion of these opposed walls of housing component 38 there is a set of threaded holes (not numbered) as seen in FIG. 12 for one of the opposed walls. Each of these opposed walls is abutted by the flat vertical surface of one wall a support housing for a shaft and gear assembly. One of the support housings is a housing 51 and the other support housing is a housing 52. At these flat vertical sides of housings 51 and 52 there are central cylindrical recesses (not numbered) and immediately above each recess there is an opening for an upper inner chamber in the housing from which extends a top cylindrical hole through which extends a vertical shaft. The top and bottom walls of each of housings 51 and 52 are flat and in alignment with the top and bottom walls of housing component 38 so that housings 51 and 52 in the assembled gauge are between and abut base plate 34 and plate 37. The housings 51 and 52 contain horizontal holes (not numbered) in alignment with threaded horizontal holes (not numbered) in housing component and bolts 53 (FIG. 18) secure housings 51 and 52 to housing component 38. The outer surfaces of the other pair of opposed walls of housing component 38 and the outer surfaces of housings 51 and 52, except for the flat vertical sides abutting housing component 38 are shaped so that the three, when secured together, provide a cylindrical outer surface, as seen in FIGS. 8–10.

The support housing 51 rotatably supports a shaft 54 that has rotatably mounted on its distal end portion a steel disc 55. A ring magnet 56 is secured on one face of disc 55. The ring magnet 56 and part of steel disc 55 are outside of the central cylindrical recess of housing 51. When housing 51 is secured to housing component 38 ring magnet 56 is within cylindrical recess 39 of housing component 38 and spaced slightly from the base of that recess. On the other side of steel disc 55 there is secured a bevel gear 57 that engages a gear 58 in the upper inner chamber of housing 51. The gear 58 is fixedly mounted on the bottom end of a vertical drive shaft 59 that extends through the top wall of housing 51, and through plate 37.

The support housing 52 rotatably supports a shaft 60 that has rotatably mounted on its distal end portion a steel disc 61. A ring magnet 62 is secured on one face of disc 61. The ring magnet 62 and a part of steel disc 55 are outside of the central cylindrical recess of housing 52. When housing 52 is secured to housing component 38 at least ring magnet 62 is within cylindrical recess 40 of housing component 38 and spaced slightly from the base of that recess. On the other side of steel disc 61 there is secured a bevel gear 63 that engages a gear 64 in the upper inner chamber of housing 52. The gear 64 is fixedly mounted on bottom end of a vertical counter shaft 65 that extends through the top wall of housing 52 and plate 37.

The ring magnets 56 and 41 constitute the drive and driven ring magnets, respectively, of the drive magnetic drive. These two ring magnets are separated by and spaced from the wall of housing component 38 having recess 39. The ring magnets 42 and 62 constitute the drive and driven ring magnets, respectively, of the driven magnetic drive. These two ring magnets are separated by and spaced from the wall of housing component 38 having recess 40. The four ring magnets are essentially coaxial.

Illustrative magnetic drives, each constituting a pair of ring magnets with steel discs as backing plates, are sold by Indiana General Corporation, Magnetic Division, Valparaiso, Ind. The magnetic drives described above are synchronous coaxial type drives.

An instrument housing (not numbered) above plate 37 is provided by a cylindrical cover 66 (FIGS. 16–18) and plate 37 on which it is secured by bolts (not numbered). The top end of counter shaft 65 is in the instrument housing. A gear 67 fixedly mounted on the top end of shaft 65 engages and drives a gear 68 fixedly mounted on the end of the shaft 69 of a counter 70 that is mounted on plate 37. The shaft 65 and gears 64, 67 and 68 constitute a driven vertical counter shaft and gear assembly. The drive shaft 59 extends upwardly through cover 66. On the top end of shaft 59 is fixedly mounted a horizontal arm 71 of a fold down handle generally indicated at 72. The handle 72 has an arm 73 that is pivotedly mounted at the distal end portion of arm 71 for rotation about a horizontal axis. The arm 73, for manual rotation of handle 72, is pivoted for use to the vertical position as shown in FIG. 8. The handle 72 is constructed with detents to keep arm 73 in the vertical or the horizontal position, as desired, until sufficient manual force is applied. Adjacent the pivotal axis of arm 71, it is provided with a bottom recess that is shaped to permit clearance for the movement of arm 71 of handle 72 to a switch-operating position.

Mounted on plate 37 in the instrument housing is a battery pack 74 (FIG. 9), an electronic module 75, and a Conax connector 76 that is sealed in a hole in wall 37 and that connects the wires of an electric cable 77 (FIGS. 2 and 7) to wires (not shown) that are connected via a cable connector 78 to electronic module 75. The wires of cable 77 are connected to a bottom component of connector 76 (FIG. 10) that extends into the bottom end of the other component of connector 76. The cable 77 extends from the housing, provided by housing component 38 and plates 34 and 37 into tube 26. The other end of cable 77 is connected as described below.

The top wall of cover 66 of the instrument housing has a window 79 positioned above counter 70 for viewing this counter. The top wall of cover 66 also has windows 79A and 79B below which an internal flag arm generally indicated at 80 moves. The arm 80 is mounted below the top wall of cover 66 for pivoting about a vertical axis at the center of cover 66 (FIGS. 17, 17A and 17B) where there is a hole that extends downwardly through the top wall of cover 66 and through a downwardly extending boss of that top wall. The pivot end portion of flag arm 80 has an upstanding boss with an annular recess. The center of that boss extends upwardly through the boss of the top wall of cover 66 and through the aligned hole in the top wall of cover 66. The center of this boss of flag arm 80 extends into a hole in the pivot end portion of an arming lever 81 above the top wall of cover 66. The flag arm 80 and arming lever 81 are connected and constructed so that the turning of lever 81 turns arm 80. In the annular recess of the boss of flag arm 80 is a torsion spring 82. One end of spring 82 extends into a hole in the pivot end portion of flag arm 80 at the annular recess of its boss. The other end extends into a hole in the top wall of cover 66. By this construction arm 80, when turned, stores energy in spring 82 to return arm 80 to its tripped position whenever flag arm 80 is released by the operation of a solenoid 83 (FIG. 19) of a solenoid-operated latch 84 (FIGS. 17 and 17A) that is mounted on the inside of the top wall of cover 66 and its latch holds arm 80 in its armed position, when moved there by turning lever 81, until the solenoid is energized. As seen in FIGS. 17A and 17B the pivot end portion of flag arm 80 has a radial extension 80' that contacts a stop (not numbered) to limit movement of arm 80 when it is released by latch 84.

The internal flag arm 80 has its distal end portion offset upwardly to place the end of the arm closer to windows 79A and 79B. A horizontal arcuate plate 87 is mounted on the raised distal end portion of arm 80 and at the radius of arm 80 it has an extension 87' toward the pivotal axis of arm 80. The portion of arcuate plate 87 extending into one direction from arm 80 is painted one color, e.g. red, and the other portion extending in the other direction from arm 80 is painted another color, e.g., yellow. The windows 79A and 79B are located so that one color on plate 87 is seen through window 79B when arm 80 is not armed and the other color appears below window 79A when arm 80 is armed. For example, the yellow color is seen through window 79A when arm 80 is in its latched position and the red color is seen through window 79B when arm 80 is not armed.

An external flag latch arm 88 is mounted on the top wall of cover 66 of the instrument housing for pivotal movement by securing its pivot end portion on an upstanding boss of a release component 89 that has its main portion below the top wall of cover 66 with its boss extending upwardly through that top wall. The release component 89 has a cavity in its upper portion into which extends the bottom end of a plunger 90 that is mounted in a vertical hole in the top wall of cover 66. When device 89 is turned to a particular position, the latch arm 88 is turned to the latching position (FIG. 17B). This detent construction maintains latch arm 88 in its latching position until release 89 is hit by the radial extension of arcuate plate 87 mentioned above.

As seen in FIG. 8, cover 66, plate 37, housing component 38 and base plate 34 in its upper part have aligned slots 91–94 at their periphery. Diagonally opposite slots 91 and 92, cover 66 and plate 92 have aligned vertical holes 95 and 96. The slots 91–94 permit proper alignment of the four components containing these notches during the assembly of the gauge. The slot 91 and holes 95 and 96 are used, as described below, for mounting the ends of external flag generally indicated at 97 (FIG. 21).

The external flag assembly 97 includes an elongated flat stainless steel spring 98. One end of spring 98 is within a slot in one end of a clamping anchor 99. The other end of anchor 99 is cylindrical and fits in holes 95 and 96 when flag 97 is mounted on the gauge. The other end of spring 98 is secured in a slotted end of a clamping anchor 100 that has its other end in the form of a cylindrical shaft that, by bending spring 98, as shown in FIG. 1, is placed in slot 91 and held in place by latch arm 88 when flag 97 is in position with internal flag arm 80 in its armed position and latch arm 88 in its latching position. Mounted on spring 98 is a flag 101 that is unfurled as shown in phantom in FIG. 21 when spring 98 returns to its straight position after latch arm 88 has been turned from its latching position by the knocking of release 98 when internal flag arm 80 moves from its armed position to the tripped position. To provide this turning movement of release 89, it is shaped as shown in FIGS. 17 and 17A to provide the extension at its periphery as mentioned above and release 89 is located so that extension is in the path of movement of radial extension 87' of arcuate plate 87 as internal flag arm 80 moves from its latched position to its tripped position. This is shown in FIGS. 17 and 17A.

A switch 102 for self testing of the electrical system, as described below, is mounted on the top wall of cover 66.

The perforated tape 29 is trained over and around drive sprocket 48. The two runs of tape 29 extend downwardly into tube 26. Near the bottom of tube 26 tape 29 is trained down and around an idler sprocket 103 that is rotatably mounted in an idler sprocket block 104. The block 104 has a central opening within which a horizontal shaft is mounted for supporting idler sprocket 103. The top and bottom ends of block 104 have integral loops 105 and 106, respectively. The bottom loop 106 is connected to the top end of a spring 107 that is connected at the bottom end to a bottom plug 108 of a track and cable guide assembly that includes an elongated vertical track guide 109 (FIGS. 2, 5, 6 and 7) having the connection to plug 108 by connecting spring 107 to a loop 108' secured on plug 108. As seen in FIG. 5 the cross section of guide 109 is approximately semi-circular and its ends have flanges that extend the length of the guide 109 and are directed toward each other at an angle greater than 90°. These flanges are reinforced by attached elongated angle members (not numbered). The probe assembly 28 travels vertically on track guide 109 as seen in FIG. 7 and described in more detail later. The sprocket idler block 104 has a pair of grooves into which fit the flanges of guide 109 so that block 104 cannot be turned.

The electric cable 77 extends downwardly into tube 26 and is trained around the bottom of a pulley 110 that is mounted on the top part of a block 111 for rotation about a horizontal axis. Mounted on the bottom part of block 111 for the turning about a horizontal axis is a pulley 112. This assembly of pulleys 110, block 111 and pulley 112 is shown in FIG. 2A. The horizontal axis of rotation of pulley 112 is normally to tape 29 in tube 26. The axis of rotation of pulley 110 is offset 33° from the axis of rotation of pulley 112 so that the run of cable 77 to pulley 110 and the run up from pulley 110 are angularly disposed with respect to the planes of the two runs to tape 29 for the purpose described later. The probe assembly 28 includes a probe 118 that extends downwardly from a probe housing 119. The housing 119 has welded to its bottom a clamp 120 through which the top end of probe 118 is inserted into the bottom part of housing 119. The clamp is then tightened. The assembly 28 also includes a stopper plate 121 that is mounted on one flat portion of the vertical surface of housing 119 at which are located threaded holes. Holes in stopper plate 121 are in alignment with the holes in housing 119. This probe assembly is mounted on one run of tape 29 in tube 26 with that run of tape 29 between stopper plate 121 and housing 119. Screws passing through perforated holes in tape 29 are secured in the threaded holes in housing 119. Probe 118 includes in its construction the light source and light sensor referred to later in connection with FIG. 20. An illustrative probe is a component of a liquid level sensor/control made by Genelco, Inc., Dallas, Tex., and sold under the trademarks Levelite 100A or Levelite 100B.

A steel cable 123 is connected at one end to the top end of a cable block 125, is trained over and around pulley 112, is trained down and around pulley 124 that is below pulley 112 and is rotatably mounted about a horizontal axis on cable block 125. The steel cable 123 is connected at its other end to an anchor 126 that is mounted on the vertical run of tape 29 in tube 26 other than the vertical run on which guide assembly 28 is mounted. The block 125 has mounted on its bottom a loop to which is connected the top end of a spring 127 that has its bottom end connected to loop 105 of block 104.

The track guide 109 extends up to the top non-raised surface portion of base plate 34. A top circular plug 127 is connected to the top end of guide 108 for its rigidity at that end. The plug 127 is in the hole in the base of sprocket support member 146 and to the curved portions of the raised elongated portions of the top part of plate 34.

The plug 127 has a central rectangular opening (not numbered) dimensioned and located so that both runs of tape 29 are spaced from plug 127 and the edges of the tape face the two longer sides of the rectangular opening. The portion of plug 127 adjacent one of the other sides of its rectangular opening is above a right-angled extension 128 of stopper plate 126. The outer end of extension 126 is away from tape 29 a distance such that extension 128 abuts plug 127, if probe assembly 28 is raised sufficiently high. Further raising is thereby prevented but synchronization of tape 29 with counter 70 is not lost, if drive ring magnet 56 is turned further, as explained earlier.

The probe housing 119 has mounted on it a cap 130 (FIG. 3B). The housing and the cap have aligned vertical grooves (not numbered) as seen in FIGS. 3 and 3B. The downward run of cable 77 is in these grooves (FIG. 3A). The housing 119 has a pair of vertical slots (not numbered) in its opposed semi-cylindrical surfaces. One of the other opposed vertical surfaces of housing 119 is flat except for a central vertical notch, while the second of these opposed surfaces is flat to abut the run of tape 29 to which housing 119 and stopper plate 121 are secured on opposite sides of tape 29. The pair of slots convergingly extend toward each other in the direction of the run of tape 29 to which housing 119 is attached. The cap 130 has slots aligned with those in housing 119.

The vertical ends of track guide 109 and its flanges extend into these slots as do the vertical ends in vertical grooves of sprocket idler block 104 so that lateral movement of probe assembly 28 and block 104 is prevented and so that probe 28 can be moved vertically with the run of tape 29 to which it is attached.

The vertical groove in housing 119 receives electrical cable 77 between connector 76 and pulley 110. That groove of housing 119 is forwardly of one of the pair of slots, i.e., between that slot and the plane at which the run of tape 29 to which housing 119 is connected. Diagonally opposite that groove, housing 119 has a vertical groove that is rearwardly of the other vertical slot as seen in FIG. 4. At the top portion of housing 119 the second groove is deepened and shaped so that the end portion of cable 77, that extends upwardly from pulley 110, can be directed to and around a circular groove in the top end of housing 119. The cap has a tab (not numbered) that fits down toward and into the deepened top end of the second groove of housing 119 so that cap 130 abuts and holds the end portion of cable 77 in the base of the deepened groove and in the circular groove of housing 119, as seen in FIG. 3B, when cap 130 is secured on housing 119. That end portion of cable 77 extends through a vertical hole (not numbered) shown in FIG. 3A. The hole extends from the circular groove to the vertical chamber of housing 119, at the bottom portion of which the wires of cable 77 are connected to probe 118.

The arm 71 of crank handle 72 has a bottom recess as mentioned above. The mounting member for arm 73 is along side of the distal end of arm 71 and is shaped so that the part of it that extends downwardly, when arm 73 is folded down, is in a radial groove (not numbered) between windows 79 and 79A (FIG. 8) in the top portion of instrument housing cover 66 as seen in FIG. 18. At that time a part of arm 71 at the location of its bottom recess is over the pivot end of arming lever 81. This bottom recess makes possible the movement of arm 71 to that position. The mounting member in the groove prevents a turning movement. When arm 71 is at that location, folded down arm 73 depresses an actuator of a handle switch 135 (FIG. 8) that is also referred to in FIGS. 19 and 20 as switch S2.

The self-test switch 102 has its actuator, shown in FIG. 8. The switch 102, that has its contacts shown in FIGS. 19 and 20, is identified there also as switch S1.

The actuator of a flag switch 136 (FIGS. 17 and 17A) that is mounted on the bottom surface of the top wall of cover 66, is actuated by extension 87' of arcuate plate 87 when flag arm 80 is moved to the armed position (FIG. 17). The switch 136 is identified also as S3 in FIGS. 19 and 20.

Referring to FIG. 19, handle switch 135 (S2) is shown as being connected in series with flag switch 136 (S3) in a circuit that is connected to the low-current positive terminal of battery pack 74 and to terminal 3 of electronic module 75 to provide voltage to terminal 3 when both switches are closed. The handle switch 135 is normally closed, but it is opened if crank handle 72 is positioned with arm 71 over housing 66, if a part of the mounting member for arm 73 is in the groove of housing 66, and if arm 73 is folded down onto the actuator of switch 135. In that case arm 73 is held in the horizontal position by the detent mentioned above. When arm 73 is raised, handle switch 135 is closed. The flag switch 136 is normally open. It is closed when arming lever 81 is turned to move flag arm 80 to the position where it is latched by solenoid-operated latch 84. At that position extension 87' of arcuate plate 87 moves the actuator of switch 136 so that the switch is then closed.

The probe 28 includes a light-emitting diode 140 that has its anode connected to terminal 7 of module 75 and its cathode connected to terminal 8 of module 75. The probe 28 also includes a NPN phototransistor 141. The diode 140 is located in the bottom portion of probe 28 and positioned so that light emitted from it is directed to the bottom tip portion of probe 28. When the tip portion is not in a liquid, light is reflected back into the tip portion of the probe where it is received by phototransistor 141. As a result, phototransistor 141 is turned on. The emitter is connected to terminal 9 and the collector is connected to terminal 10 of module 75. The terminal 4 of module 75 is connected to one end of solenoid 83 that has its other end connected to terminal 6 of module 75. The terminal 4 is also connected to the negative terminal of battery pack 74. The high-current positive terminal of pack 74 is connected to terminal 5 of module 75.

The module 75 is constructed with a circuit that provides a switching for a flow of current through solenoid 83 is phototransistor 141 is turned off due to the immersion of the tip portion of probe 28 in liquid. At that time light from diode 140 is not refracted back into probe 28. Of course, the circuit is provided with voltage at terminal 3 of module 75 only if switches 135 and 136 are closed.

To extend the life of battery pack 74, the circuitry of module 75 has a design within the skill of the art of logic gate circuitry such that, when switches 135 and 136 are closed, current flows through diode 140 only for a short period of time of each cycle of repetitive cycles of operation of diode 140. The terminal 10 is connected to a part of the circuitry that includes a pair of 2-input NAND gates. The first input of each of the two gates is connected to another part of the circuitry that normally provides a low-level voltage ($V_{OL}$) but in each cycle high-level voltage ($V_{OH}$) for a brief time during the short period of time during which current flows through diode 140. Another part of the circuitry connected to terminal 10 normally provides a high-level voltage to the second input of the first NAND gate and a low-level voltage to the second input of the second NAND gate, if phototransistor 141 is conducting. This is the normal condition if current is flowing through diode 140 and if the probe tip is not in liquid. The output of the first NAND gate is connected to the reset input of a flip flop and the output of the second NAND gate is connected to the set input of the flip flop.

If, during the brief time of a cycle, when the first inputs of the two NAND gates are provided with a high-level voltage, terminal 10 has a high-level voltage because phototransistor 141 is not conducting, the second NAND gate provides a low-level voltage to the set input of the flip flop and the first NAND gate provides a high-level voltage to the reset input of the flip flop. This results in a setting of the flip flop to provide a high-level voltage at its output that is connected to a switching circuit of module 75. This high-level voltage signal at this output of the flip flop turns on the switching circuit to provide a flow of current from terminal 5 through solenoid 80 to terminal 6 whereby latch 80 is operated to release flag arm 80 from the armed position so that arcuate plate 87 moves to the tripped position. During that movement extension 87' moves latch arm 88 to release one end of external flag assembly 97, if it had been placed in position and arm 88 had been moved to its latching position. This setting of the flip-flop can occur only during the brief time during the short period of time of each cycle that diode 140 is operated and then only if phototransistor 141 is not conducting. If the flip-flop is set, it is reset after that brief time because the voltage to the first inputs of the gates changes to the high-level voltage and the input to the second input of the first gate changed to a high-level voltage to provide a low-level voltage to the reset input of the flip-flop and the output of the second gate changes to a high-level voltage.

The terminal 1 is connected to terminal 7. Terminals 2, 8 and 9 are connected to ground. Terminal 4 is connected to ground and is connected to a capacitor that is connected to terminal 3. The various components that are connected to terminal 3 would be provided voltage when switches 135 and 136 are closed.

The switch 102 (S1) is normally open. It is a pushbutton switch. When it is closed manually it provides the same function, if switches 135 and 136 are closed, as occurs when phototransistor 141 is non-conducting at the time that its output to terminal 10 is gated by the circuitry during the part of a cycle in which current is passing through diode 140. This is because switch 102 provides a short to diode 140 whereby it does not emit light and thus phototransistor 140 is not conducting even if the tip portion of probe 28 is not in a liquid. Thus, switch 102 provides a test of the release of flag arm 80 by the operation of solenoid 83.

The foregoing summary of the invention has been described as a construction for its preferred use with a railway tank car. Also, the foregoing detailed description of the preferred embodiment of the gauge includes two synchronous coaxial type magnetic drives, each having its two ring magnets on opposite sides of a vertical wall of opposed side walls. That construction resulted from the initial concept from which it was deemed that the invention in its broadest scope includes modified constructions that are less advantageous. Such constructions include the use, instead of the coaxial type of magnetic drive, of the radial type of magnetic drive or of bar magnets.

Another modified construction uses only the magnetic drive that results in the vertical movement of the probe, i.e., liquid-level sensing means. Instead of the other magnetic drive to operate the reversible counter, the modified construction can include in the housing an electronic device that monitors the extent of rotary motion of the magnet, of the magnetic drive, in the housing and by an electric cable through a housing wall the signals from the monitoring device, that are indicative of the probe's position when it senses liquid, are transmitted to a visual display or a printer for a print out of the volume of liquid in the tank.

Furthermore, by another modified construction of the drive mechanism that connects the driven magnet of the drive magnetic drive to the probe below for vertical movement of the latter upon rotary movement of that magnet, that magnetic drive may be at the top wall instead of at a side wall of the housing. That, alternatively or additionally, can be the location of the driven magnetic drive for the counter or other drive operated by rotation of the drive magnet of that magnetic drive.

Of course, for the use of the radial type of magnetic drive, the wall of the housing separating the two magnets has an offset at that location so that one magnet is within the offset on one side of the wall, and the other is outside the offset on the other side of the wall.

The foregoing description has been presented solely for the purpose of illustration and not by way of limitation of the invention because the latter is limited only by the claims that follow.

We claim:

1. A liquid level gauge for a tank, which comprises:
    liquid-level sensing means;
    a housing, that in the use of the gauge is mounted at a top opening of the tank, said housing having:
        a horizontal bottom wall with an opening that is in alignment with the top opening of the tank when said gauge is mounted for use;
        side wall; and
        a top wall,
        said housing having no other opening through which any moving component of said gauge extends so that a dynamic seal would be required;

a magnetic drive having a drive magnet and a driven magnet;

a first shaft mounted in said housing and having said driven magnet fixed mounted on it closely spaced from the inside surface one of said side walls and top wall;

a second shaft mounted outside said housing and having said drive magnet mounted on it for rotation closely spaced from the outside surface of said one wall to provide turning of said driven magnet upon turning of said drive magnet;

means, that is outside said housing, connected to said drive magnet to rotate it;

means connected to and supporting said liquid-level sensing means and extending upwardly through said opening in said bottom wall of said housing;

means in said housing connected to said first shaft and to said support means connected to said liquid-level sensing means, said means connected to said first shaft and said means supporting said liquid-level sensing means being constructed to provide vertical movement of said liquid-level sensing means upon rotation of said first shaft;

means responsive to the rotation of said first shaft to indicate the position of said level-sensing means relative to a reference position, said responsive means having a component in said housing and a component outside said housing and constructed so that said inside component operates said outside component without a connection through said housing that requires a dynamic seal; and means connected to and constructed to be responsive to the operation of said liquid-level sensing means, when it senses the liquid level at the liquid-level sensing means during relative vertical movement of the liquid level and the liquid-level sensing means, to indicate the operation of said liquid-level sensing means.

2. A liquid level gauge for a tank, which comprises:
liquid-level sensing means;
a housing, that in the use of the gauge is mounted at a top opening of the tank, said housing having:
a horizontal base plate with an opening that is in alignment with the top opening of the tank when said gauge is mounted for use;
a pair of opposed vertical side walls, each having a portion has parallel vertical inner and outer flat surfaces; and
a top plate mounted on the side walls of and enclosing the top end of the housing;
a first horizontal shaft in said housing;
a first shaft support means mounted in said housing and rotatable mounting said first shaft so that a central portion of said shaft extends over said opening in said base plate and said shaft extends toward and normal to said opposed side walls of said housing;
means connected to and supporting said liquid-level sensing means and extending upwardly through said opening in said base plate into said housing;
means in said housing connected to said central portion of said first shaft and to said support means connected to said liquid-level sensing means, said means connected to said central portion of said first shaft and said means supporting said liquid-level sensing means being constructed to provide vertical movement of said liquid-level sensing means upon rotation of said first shaft;

a first magnetic drive having a drive ring magnet and a driven ring magnet, said driven ring magnet being fixedly mounted on one end of said first shaft within said housing and closely spaced from said flat inner surface portion of one of said opposed side walls of said housing;

a second horizontal shaft having mounted on one end of it said drive ring magnet of said first magnetic drive;

a second shaft support means mounted outside said housing and adjacent said one side wall of said pair of opposed side walls, said second shaft support means mounting said second shaft normal to said flat outer surface portion of said one side wall of said opposed side walls with said drive ring magnet of said first magnetic drive closely spaced from said outer surface portion of said one of said pair of opposed walls and essentially in alignment with said driven ring magnet of said first magnetic drive;

means connected to said drive ring magnet of said first magnetic drive to rotate that ring magnet;

a second magnetic drive having a drive ring magnet and a driven ring magnet, said drive ring magnet being fixedly mounted on the other end of said first shaft within said housing and closely spaced from said flat inner surface portion of the other of said opposed side walls of said housing;

a third horizontal shaft having mounted on one end of it said driven ring magnet of said second magnetic drive;

a third shaft support means mounted outside said housing and adjacent said other side wall of said pair of opposed side walls, said third shaft support means mounting said third shaft normal to said flat outer surface portion of said other side of said opposed side walls with said driven ring magnet of said second magnetic drive closely spaced from said outer surface portion of said other of said pair of opposed walls and essentially in alignment with said drive ring magnet of said second magnetic drive;

means connected to said third shaft and constructed to provide by the rotation of said third shaft an indication of the vertical position of said liquid-level sensing means; and means connected to and constructed to be responsive to the operation of said liquid-level sensing means, when it senses the liquid level at the liquid-level sensing means during the relative vertical movement of the liquid level and the liquid-level sensing means, to indicate the operation of said liquid-level sensing means, said means including electric cable means extending through one of said top and side walls of said housing, through said opening in said bottom wall of said housing, and connected to said liquid-level sensing means.

3. The liquid level gauge of claim 2 wherein:
said means in said housing connected to said central portion of said first shaft and to said support means connected to said liquid-level sensing means comprises a first sprocket fixedly mounted on said first shaft; and said means connected to and supporting said liquid-level sensing means comprises:
  a second sprocket below said liquid-level sensing means;
  means rotatably mounting said second sprocket about an axis parallel to the axis of rotation of said first sprocket;
  a perforated tape trained over and around and engaging said first sprocket and extending downwardly through said opening in said base plate of said housing, trained under and around and engaging said second sprocket to provide first and second vertical runs of said tape between said first and second sprockets, said liquid-level sensing means being mounted on said first run of said tape below said base plate of said housing to be inside the tank in the use of the gauge;
  spring means connected at its top end to said means mounting said second sprocket; and
  means connected to said spring means at its bottom end and mounted, at least in the use of the gauge, a fixed distance below said first sprocket, to restrain upward movement of said second sprocket.

4. The liquid level gauge of claim 3 wherein:
said outer surfaces of said opposed walls are vertical and flat and their flat outer surface portions are at the base of cylindrical recesses;
said second shaft support means includes a second housing with a side wall having an opening to the chamber of the housing and having a vertical flat outer surface, said second housing being mounted on said one side wall of said opposed side wall with their flat outer surfaces abutting each other and with said second shaft extending into said recess in said one side wall of said opposed side walls with said ring magnet on that shaft closely spaced from the base of that recess;
said means connected to and to rotate said drive ring magnet of said first magnetic drive comprises: a vertical shaft and gear drive assembly supported by said second housing and including a first gear mounted on said second shaft and connected to said drive ring magnet, a second gear engaging said first gear and fixedly mounted on the bottom end portion of said vertical shaft of said drive assembly, said vertical shaft extending upwardly through said second housing; and
a crank handle fixedly mounted on the top end portion of said vertical shaft;
said third shaft support means includes a third housing with a side wall having an opening to the chamber of the housing and having a vertical flat outer surface, said third housing being mounted on said other side wall of said opposed side walls with their flat outer surfaces abutting each other and with said third shaft extending into said recess in said other side wall of said opposed side walls with said ring magnet on that shaft closely spaced from the base of that recess;
said means connected to said driven ring magnet of said second magnetic drive comprises:
  a vertical shaft and gear driven assembly supported by said third housing and including a first gear mounted on said third shaft and connected to said driven ring magnet, a second gear engaging said first gear and fixedly mounted on the bottom end portion of said vertical shaft of said driven assembly, said vertical shaft extending upwardly through said third housing, and a third gear fixedly mounted on the top end portion of said vertical shaft of said driven assembly; and
said means to indicate the vertical position of said liquid-level sensing means comprises a reversible counter mounted on said top plate and having mounted on its shaft a gear engaging said third gear of said driven assembly.

5. The liquid level gauge of claim 4 wherein:
said liquid-level sensing means comprises an optoelectronic device having a light source, a light sensor, and a transparent bottom tip shaped so that the light from said light source is refracted to said light sensor when said tip is not in liquid and the light passes out of said tip and is not received by said light sensor when said tip is in liquid; and
said responsive means connected to said liquid-level sensing means comprises:
  a cable, of said cable means, having wires connected to said light source and wires connected to said light sensor and extending upwardly through said opening in said base plate;
  cable connector means, of said cable means, mounted in and through said top plate of said housing containing said first shaft and connected to the top end of said cable;
  an electronic module having terminals connected to said cable connector means; and
  a battery pack mounted on said top plate and having terminals connected to other terminals of said electronic module,
said gauge further including:
  an instrument housing having a cover mounted on said top plate and enclosing said module, said counter, and said battery pack, said vertical shaft of said drive assembly extending through the top wall of said cover of said instrument housing and said crank handle being above said cover;
  a first window mounted in said top wall of said cover in alignment with said counter;
  second and third windows mounted in said top wall of said cover;
  solenoid-operated latch means including a latch and a solenoid and mounted in said instrument housing and supported by said top wall of said cover, said solenoid being connected to said module;
  a flag arm having a cylindrical upstanding boss at its pivot end with a higher central portion extending through a center hole of said top wall of said cover, said boss having a cylindrical recess around its said higher central portion;
  an arming lever above said instrument cover and connected to said higher portion of said boss and supporting said flag arm, said arming lever by its pivotal movement providing pivotal movement of said flag arm;
  an arcuate plate mounted on the distal end of said flag arm, said arcuate plate having a length and being located on said flag arm and said second and third windows being positioned so that one end portion of said arcuate plate is below said second window when said flag arm is at its triggered position and the other end portion of said arcuate plate is below said third window when said radial arm is at its latched position, and said solenoid-operated latch is positioned so that its latch engages and holds said arcuate plate, when said flag arm is moved to its latched position, until said solenoid is operated;

spring means mounted in said cylindrical recess in said one end of said flag arm and connected to said top plate and to said flag arm to store energy when said flag arm is moved from its tripped position to its cocked position at which said flag arm is latched; and stop means in said instrument housing and mounted to stop the movement of said flag arm at its triggered position when moved by said spring means from said cocked position;

said opto-electronic device providing a change of level of voltage from said light sensor when said tip meets liquid during relative movement and said module in response to that change of level of voltage providing voltage from said battery for current flow through said solenoid to trigger said flag arm.

6. The liquid level gauge of claim 5 and further including:

handle switch means mounted on said top wall of said cover of said instrument housing and having an actuator extending upwardly from said cover and a switch in said instrument housing; and flag switch means including a switch and an actuator mounted in said instrument housing and located to be operated by one of said flag arm and said arcuate plate, when said arcuate plate is latched, to close said flag switch so long as said flag arm is cocked, wherein: said crank handle is a fold-down handle have:

a horizontal arm fixed mounted on said top end portion of said vertical shaft of said shaft and gear drive assembly;

a fold-down arm pivotally mounted on the distal end portion of said horizontal arm for movement from a horizontal storage position to a vertical position to manually rotate said vertical shaft of said drive assembly, said fold-down arm being constructed at its pivot end with a portion that extends into a slot in the top of said cover to prevent turning movement of said handle, said horizontal arm supporting a horizontal plunger engaging detents in said pivot end portion of said fold-down arm to maintain it in vertical or horizontal position until forced from that position;

said actuator of said handle switch is located to be operated by said fold-down arm, when said its portion at its pivot end is in said slot in said top of said cover at the time said fold-down handle is in stored position, to open said handle switch; and said handle switch and said flag switch being connected in series in a circuit connecting said module to the positive terminal of said battery pack, to limit battery use to the condition that crank handle is unfolded and said flag arm is cocked.

7. The liquid level gauge of claim 6 wherein:

said arcuate plate has a central extension that extends radially inward toward the pivot axis of said flag arm;

said instrument housing cover having a vertical hole at its periphery and a vertical slot at its periphery diagonally opposite said vertical hole in said cover, said gauge further including:

an external flag latch arm pivotally mounted on said top wall of said instrument housing and having a notch at its distal end;

a release component having its main portion with a radial extension below said top wall cover, having an upstanding central boss extending through that wall and connected to said latch arm, and having a detent in its upper surface below said top wall in which is mounted a plunger to retain said latch arm in latching position with its notch over said vertical slot in said cover;

external flag means comprising:
an elongated flat spring;
a flag mounted on an intermediate portion of said flat spring; first and second clamping anchors clamping the two ends of said flat spring and having a cylindrical portion adjacent their free ends, said flag means when set for use has said flat spring bent, said flag furled, said cylindrical portions of said clamping anchors in said vertical slot and hole in said cover and said latch arm in position to prevent movement of said clamping anchor out of said slot, said radial extension of said release component being hit by said radial extension of said arcuate plate, during the movement from cocked to triggered position, to pivot said latch arm for release of said clamping anchor in said slot to provide an unfurling of said flag.

8. The liquid level gauge of claim 7 wherein:

said opto-electronic device is mounted in the bottom portion of a probe housing with said tip extending downwardly below said probe housing, said housing for the probe having a vertical flat surface portion at which it is secured on one surface of said first run of said tape to mount said opto-electronic device to said tape, said gauge further including:

a first pulley block having rotatably mounted on its top part a first pulley and on its bottom part a second pulley so that the horizontal axes of rotation of said pulleys are angularly disposed with respect to each other and the axis of rotation of said second pulley is normal to said vertical runs of said tape;

a second pulley block mounting a third pulley for rotation about a horizontal axis, said second pulley block being below said first pulley block and above said means rotatably mounting said second sprocket;

second spring means connected at one end to said second pulley block and at the other end to said means rotatably mounting said second sprocket;

a cable secured at one end to said second run of said perforated tape, extending downwardly and around said third pulley, up and around said second pulley and then downwardly to and connected to said second pulley block to provide a downward force on said first pulley block and said electric cable of said cable means that is trained down and around said first pulley and upward to said opto-electronic device;

a track and cable guide assembly including:
an elongated vertical track guide having a cross section that is approximately semicircular and having, at its elongated ends, flanges that extend the length of said track guide, said flanges are directed toward each other at an angle that is greater than 90°;

a bottom circular plug connected to the bottom end of said track guide, said bottom plug being said means mounted said fixed distance below said first sprocket and connected to said bottom end of said spring means connected at its top end to said means mounting said second sprocket; and a top plug connected to the top end of said track guide, said top plug being mounted and connected in said housing above said base plate and having a central opening in alignment with said opening of said base plate; and a vertical stopper plate secured to said probe housing at said flat surface portion with said first run of said tape between them, said stopper plate having at its top end a horizontal flange extending away from said first run of said tape, and wherein:

said probe housing and said means mounting said second sprocket having for each a pair of angularly disposed vertical grooves into which said flanges of said track guide extend to prevent turning of said probe housing and said means mounting said second sprocket, and said probe housing riding along said track guide during its vertical movement;

said probe housing has a pair of cable-guiding vertical grooves on opposite sides of a vertical plane passing through the base of said angularly disposed grooves of said probe housing, one of said cable-guiding grooves containing the downward run of said electric cable to said first pulley and the other cable-guiding groove containing the upper run of said electric cable to the top of said housing where it extends down into said housing for its wires having connections to said opto-electronic device; and said top plug has its central opening dimensioned so that said tape clears said top plug and said flange of said stopper plate is in alignment with said top plug to limit the upward movement of said opto-electronic device.

* * * * *

UNITED STATES PATENT AND TRADEMARK OFFICE
CERTIFICATE OF CORRECTION

PATENT NO. : 4,126,040

DATED : November 21, 1978

INVENTOR(S) : Alan J. Varacins et al.

It is certified that error appears in the above-identified patent and that said Letters Patent are hereby corrected as shown below:

```
Column  2, line 37, "indicates" should read --includes--.
Column  4, line 19, "outer drive" should read --outer driven--.
Column  7, line 24, "FIG. 1" should read --FIG. 7--.
Column  9, line  6, "the opening" should be deleted.
Column 11, line 12, "80'" should read --(not numbered)--.
Column 12, line 44, "pulleys" should read --pulley--.
           Line 46, "normally" should read --normal--.
Column 15, line  5, "is phototransistor" should read
                    --if phototransistor--.
           Line 46, "solenoid 80" should read --solenoid 83--;
                    "latch 80" should read --latch 84--.
Column 16, line 65, "side wall" should read --side walls--.
Column 17, line  6, "fixed" should read --fixedly--.
           Line 49, "has" should read --that has--.
Column 18, line 40, "other side" should read --other side wall--.
Column 19, line 33, "opposed side wall" should read
                    --opposed side walls--.
Column 21, line 34, "have" should read --having--.
           Line 37, "assembly;" should read --assembly; and--.
```

Signed and Sealed this

Thirteenth Day of March 1979

[SEAL]

Attest:

RUTH C. MASON
Attesting Officer

DONALD W. BANNER
Commissioner of Patents and Trademarks